3,036,020
PROCESS OF MAKING CELLULAR POLYURETHANE USING N,N - DIALKYL - 3 - (DIALKYL AMINO) PROPYLAMINE CATALYST

J. W. Britain, Hillside, W. Va., assignor to Mobay Chemical Company, Pittsburgh, Pa., a corporation of Delaware
No Drawing. Filed June 30, 1958, Ser. No. 745,266
7 Claims. (Cl. 260—2.5)

This invention relates generally to a new class of chemical compounds and, more particularly, to a class of compounds which are particularly well suited for catalyzing the reaction between organic polyisocyanates and organic compounds having hydrogen atoms which react with an isocyanate group to form urethane linkages and to an improved process for making cellular polyurethane plastics.

Solidified cellular polyurethanes may be formed by reacting an organic polyisocyanate with water and an organic compound having hydrogen atoms which are reactive with the NCO groups of the polyisocyanate to form a urethane linkage. Carbon dioxide is formed when water and an isocyanate group in the reaction mixture react together. The carbon dioxide becomes entrapped in the viscous liquid formed by reaction between the organic compound having reactive hydrogen atoms and the organic polyisocyanate. The product obtained upon solidification of the resulting mixture is a porous or cellular plastic.

It has been found that tertiary amines tend to accelerate the reaction which results in the formation of the cellular polyurethane. Most of the heretofore available tertiary amines have some undesirable characteristics which detract from their generally advantageous properties and, consequently, are not entirely suitable. Some of the heretofore available catalysts are too volatile to remain in the reaction mixture until chemical reaction has been completed. Others impart an obnoxious odor to the product. Still others are unsatisfactory because they are toxic.

It is, therefore, an object of this invention to provide a new class of chemical compounds which may be used to advantage as a catalyst in preparing cellular polyurethanes. Another object of the invention is to provide an improved catalyst for chemical reactions which produce cellular polyurethanes. Still another object of the invention is to provide an improved process for making polyurethanes. A further and more specific object of the invention is to provide a process for making polyurethanes which are substantially free from obnoxious odors.

The foregoing objects and others which will become apparent from the following description are accomplished in accordance with this invention, generally speaking, by providing a class of compounds which may be represented by the formula

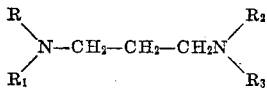

wherein R, $R_1$, $R_2$, and $R_3$ are alkyl radicals having from 1 to 4 carbon atoms, R and $R_1$ may be connected together to form a ring and $R_2$ and $R_3$ may be connected together to form a ring. These N,N-dialkyl-3-(dialkyl amino) propylamines have been found to be particularly advantageous as a catalyst for a reaction wherein an organic polyisocyanate, water and an organic compound having hydrogen atoms reactive with the NCO group of the polyisocyanate react together to form a cellular polyurethane. The invention thus contemplates a process for making cellular polyurethanes from the aforesaid components including a catalyst containing one or more compounds provided by this invention. Although the organic compound having reactive hydrogens, the polyisocyanate, water and catalyst may all be mixed together simultaneously, it is preferred to react the polyisocyanate and organic compound having reactive hydrogens together to make an adduct or prepolymer having terminal NCO groups and to then add the water and catalyst to effect cross-linking and to prepare a cellular polyurethane.

The catalyst provided by this invention is effective for making a polyurethane in combination with any of the reactants known to react together to produce a polyurethane. The organic compound having reactive hydrogen atoms may be any suitable compound of this type, such as, for example, a polyester, a polyalkylene ether glycol, a polyalkylene thioether glycol, a polyester amide, a polyacetal, the polymer formed by condensation of carbon monoxide and an olefine, and the like. Those organic compounds having reactive hydrogens disclosed in U.S. Patent 2,764,565 may be used. The polyester may be prepared by esterification of any suitable aromatic or aliphatic polycarboxylic acid and any suitable polyhydric alcohol. Suitable polycarboxylic acids are, for example, adipic acid, succinic acid, maleic acid, terephthalic acid or the like. Suitable polyhydric alcohols include, for example, ethylene glycol, diethylene glycol, propylene glycol, trimethylol propane, glycerine, and the like. Preferably, an excess of the alcohol is used in the esterification in order that the resulting polyester will have terminal alcohol hydroxyl groups instead of terminal carboxyl groups.

Preferably the organic compound having reactive hydrogen atoms should have a molecular weight of at least about 500 and an OH number of not more than about 225. Preferably the acid number of the polyester should be in the neighborhood of from zero to about two. The molecular weight of the adduct or prepolymer prepared by reaction of a polyisocyanate and an organic compound having reactive hydrogens should be at least 1000.

The polyalkylene ether glycol may be prepared by condensation of any suitable alkylene oxide, such as, for example, ethylene oxide, propylene oxide, butylene oxide, and the like, or by condensation of one of these oxides with a suitable polyhydric alcohol, such as, for example, glycerol or trimethylol propane or, preferably, with a glycol, such as, for example, ethylene glycol, diethylene glycol, or the like or mixtures of one or more glycol or other polyhydric alcohol. The polyalkylene thioether glycol may be prepared by condensation of a thioglycol, such as, for example, dithioglycol or by condensation of a thioglycol with a glycol. The product of the latter process will contain both oxygen and sulfur hetero atoms in its chain.

The polyacetal may be prepared by condensing a suitable aldehyde with an alkylene oxide, such as, for example, formaldehyde and ethylene oxide. The polyester amide may be prepared by esterification of a polycarboxylic acid with an amino alcohol, such as, for example, adipic acid and ethanol amine.

Any suitable organic polyisocyanate including those disclosed in U.S. Patent 2,764,565 may be used to react with the water and organic compound having reactive hydrogen atoms. Examples of suitable polyisocyanates are 2,4-toluylene diisocyanate, 2,6-toluylene diisocyanate, ethylene diisocyanate, propylene-1,2-diisocyanate, cyclohexylene-1,2-diisocyanate, 3,3'-dichloro-4,4'-biphenylene diisocyanate, triphenyl methane triisocyanate, 4,4'-diphenyl methane diisocyanate, and the like or mixtures thereof. Any suitable organic polyisothiocyanate, such as, for example, ethylidene diisothiocyanate, butylene 1,3-diisothiocyanate, para-phenylene diisothiocyanate and the like, may be used instead of the organic polyisocyanates or in admixture therewith if desired. In other words, any compound having the formula $R(CNX)_n$ wherein R is a divalent, organic radical, X is either oxygen or sulfur and $n$ is an integer, usually two or three, may be used.

The catalyst and other components of the polyurethane plastic may be mixed together by any suitable means, but it has been found particularly advantageous to use an apparatus of the type disclosed in the Hoppe et al. U.S. Patent 2,764,565. The components must be mixed together rapidly and the resulting mixture must be discharged into the shaping apparatus immediately after mixing in order to avoid expansion and solidification of the reaction liquid into a cellular polyurethane while still in the mixing apparatus. It has been found that the most desirable cellular polyurethane plastic is formed when a polyalkylene ether glycol is mixed with an excess of an arylene diisocyanate and the resulting prepolymer or adduct having terminal NCO groups is then mixed with additional polyisocyanate and water and a catalytic compound provided by this invention. The preparation of cellular polyurethanes by this process is, thus, preferred. A mixture of about 80 percent 2,4-toluylene diisocyanate and about 20 percent 2,6-toluylene diisocyanate is preferred as the polyisocyanate component of the reaction mixture.

The novel catalytic compounds provided by the invention may be prepared by reacting any appropriate alkyl diamine with formaldehyde in the presence of formic acid or hydrogen and any suitable catalyst, such as Raney nickel, platinum or the like.

Using the preparation of N-methyl-N-isopropyl-dimethyl amino propylamine as an example of the process contemplated for making the novel catalysts provided by this invention, the reaction can be illustrated by the following chemical equation:

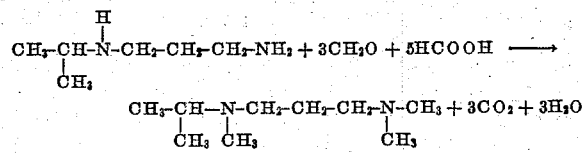

In one embodiment of the process illustrated by the equation, about 450 parts by weight para-formaldehyde and about 1080 parts by weight 85 percent formic acid aqueous solution are mixed together and heated to above 90° C. in a vessel equipped with a stirrer and reflux condenser.

About 500 parts by weight of 85 percent aqueous formic acid solution (i.e., about 425 parts by weight formic acid) and about 580 parts by weight 3-isopropyl-amino-propylamine are mixed together and the resulting mixture is slowly added to the mixture of para-formaldehyde and formic acid in the aforesaid reaction vessel. Carbon dioxide is evolved from the reaction mixture and after the two mixtures have been completely mixed together the resulting reaction mixture is held at from about 90° C. to about 105° C. until no more carbon dioxide evolution is evident. The mixture is then heated to about 120° C. and held at this temperature until all water has been distilled therefrom. The product remaining in the vessel after distillation is mixed with an equal volume of 50 percent aqueous potassium hydroxide solution. Two liquid layers are formed and the top layer of the product is separated from the bottom aqueous layer. Any product remaining in the aqueous layer is salted out by addition of solid potassium hydroxide and then separated from the aqueous layer. The product thus obtained is dried over potassium hydroxide pellets or similar drying agent. The product is a colorless liquid having an odor resembling ammonia. The yield is at least 75 percent of the theoretical yield indicated by the above equation.

The process just described for making N-methyl-N-isopropyl dimethylamino propylamine may be used for making any of the other catalysts provided by this invention by substituting the appropriate amine for the 3-isopropyl-amino propylamine of the foregoing embodiment. Examples of compounds which may be prepared in accordance with the foregoing process when using the proper diamine are N-methyl-N-isopropyl-3-(dimethylamino) propylamine, N,N-diethyl-3-(dimethylamino) propylamine, N,N-dipropyl-3-(dimethylamino) propylamine, N-ethyl-N-isopropyl-3-(dimethylamino) propylamine, N-propyl-N-isopropyl-3-(dimethylamino), N-(3-dimethylamino-propyl) morpholine, N-(3-dimethylamino-propyl) piperidine, and the like.

Each of the novel compounds provided by this invention may be used as a catalyst in the preparation of cellular polyurethane plastics, which in turn have many commercial uses, such as, for example, as interlinings in clothing, cushions, upholstery, carpet underlay, crash pads for the dashboard of automobiles, sponges, and the like.

In order to better describe and further clarify the invention, the following are detailed descriptions of specific embodiments of the invention:

Example 1

About 100 parts by weight of a polyalkylene ether glycol prepared by condensing propylene oxide and then condensing the resulting polymer with sufficient ethylene oxide to provide an ether containing about 10 percent $-(C_2H_4O)-$ groups in the chain and having a molecular weight of about 1800 are mixed with about 3 parts by weight trimethylol propane and about 0.02 part benzoyl chloride. The resulting mixture is heated to about 60° C. and about 20 parts of an 80/20 mixture of 2,4-toluylene diisocyanate and 2,6-toluylene diisocyanate are incorporated therein. The mixture is heated further until the temperature is from about 90° C. to about 100° C. and the viscosity of the mass at about 70° C. is from about 1,200 to about 1,400 centipoises. The viscosity is determined with a Brookfield spinning disc viscosimeter with a Number 4 spindle.

The resulting prepolymer having terminal NCO groups is mixed with about 4 parts 80/20 mixture of 2,4-toluylene diisocyanate and 2,6-toluylene diisocyanate, about 2.5 parts by weight water and about 1 part N,N-diethyl-3-(dimethylamino) propylamine per 100 parts prepolymer. After these components have been completely mixed together, the reaction mixture is discharged immediately into a suitable shaping device, such as a mold where chemical reaction proceeds with the formation of a solidified cellular polyurethane having a density of about 2 pounds per cubic foot. The water, catalyst and prepolymer are preferably mixed together in an apparatus similar to that disclosed in the aforesaid Hoppe et al. patent. Preferably, the prepolymer has a temperature of about 38° C. as it enters the mixing chamber. The cellular product obtained is substantially free from any obnoxious odor within 24 hours after solidification thereof. The only odor detectable during the first 24 hours is a mild scent resembling ammonia which is not objectionable in the small concentration present. Only very small quantities of the catalyst, such as, for example, 0.5 percent to 1.5 percent, are required because of the effectiveness of the catalyst. It is pointed out that the reaction between the polyalkylene ether glycol and toluylene diisocyanate which results in the prepolymer is preferably conducted under substantially anhydrous conditions to avoid the formation of carbon dioxide in this stage of the process.

Example 2

About 100 parts by weight of a polyalkylene ether glycol prepared in accordance with the process described in Example 1 and having a molecular weight of about 1800 are mixed with about 3 parts by weight trimethylol propane and about 0.02 part benzoyl chloride. The resulting mixture is heated to about 60° C. and about 20 parts of an 80/20 mixture of 2,4-toluylene diisocyanate and 2,6-toluylene diisocyanate are incorporated therein. Heating is continued until the temperature has reached from about 90° C. to about 100° C. and the viscosity of the mass at about 73° C. is from about 1200 centipoises to about 1400 centipoises. The viscosity is determined with a Brookfield spinning disc viscosimeter using a Number 4 spindle.

About 100 parts of the resulting prepolymer having terminal NCO groups is mixed with about 4 parts 80/20 mixture of 2,4-toluylene diisocyanate and 2,6-toluylene diisocyanate, about 2.5 parts by weight water and about 1.5 parts N,N-diethyl-3-(dimethylamino) propylamine. The resulting mixture is discharged substantially immediately after the components have been thoroughly mixed together. Chemical reaction proceeds and a solidified celular polyurethane having a density of about 2 pounds per cubic foot is obtained. The apparatus disclosed by Hoppe et al. in U.S. Patent 2,764,565 is preferably used to effect mixing of the components. The temperature of the prepolymer as it enters the mixing chamber is about 38° C. The product is substantially free from any obnoxious odor.

*Example 3*

About 100 parts of polypropylene ether glycol prepared by condensing propylene oxide and having a molecular weight of about 2000 are mixed with about 3 parts by weight trimethylol propane and about 0.02 part benzoyl chloride. This mixture is heated to about 60° C. and about 20 parts of an 80/20 mixture of 2,4-toluylene diisocyanate and 2,6-toluylene diisocyanate are mixed therewith. Heating is continued until a temperature of from about 90° C. to about 100° C. is reached and the temperature is maintained within this range until the viscosity of the mass at 73° C. is from about 1,200 to about 1,400 centipoises. The viscosity is determined with a Brookfield spinning disc viscosimeter using a Number 4 spindle.

About 100 parts of the resulting prepolymer and any unreacted toluylene diisocyanate present are mixed with about 3 parts 80/20 mixture of 2,4-toluylene diisocyanate and 2,6-toluylene diisocyanate, about 0.5 part N-methyl-N-isopropyl-3-(dimethylamino) propylamine and about 2 parts water. Chemical reaction proceeds after the components have been mixed together and a solidified celular polyurethane having a density of about 2.5 pounds per cubic foot is obtained.

*Example 4*

About 100 parts of the prepolymer prepared in Example 2 is mixed with about 3 parts 80/20 mixture of 2,4-toluylene diisocyanate and 2,6-toluylene diisocyanate, about 2 parts water and about 0.75 part N-methyl-N-isopropyl-3-(dimethylamino) propylamine. Chemical reaction proceeds and a solidified cellular polyurethane having a density of about 2.5 pounds per cubic foot is obtained.

The product obtained in Examples 3 and 4 are substantially free from any obnoxious odor.

It is to be understood that any of the catalyst making up the class of compounds provided by this invention may be substituted for those used in the foregoing examples. Likewise, the other polyisocyanates and other organic compounds having reactive hydrogen atoms disclosed herein, such as polyesters or the like, may be substituted for those used in the foregoing examples. The ring formed by the joining of R and $R_1$ and by the joining of $R_2$ and $R_3$ may be heterocyclic, aromatic or alicyclic.

The catalyst is to be used in catalytic amounts. Usually from about 0.25 part to about 2 parts by weight catalyst per 100 parts prepolymer or per 100 parts organic compound having reactive hydrogen atoms and polyisocyanate mixture are preferred. The catalyst may be mixed with water and used in this form if desired or it may be mixed separately with the other components.

Preferably, the organic compounds having the reactive hydrogen atoms should have a molecular weight of at least 500 and usually they will not have a molecular weight greater than about 10,000.

Although the invention has been described in considerable detail in the foregoing for the purpose of illustration, it is to be understood that such detail is solely for this purpose and that variations can be made by those skilled in the art without departing from the spirit and the scope of the invention except as set forth in the claims.

What is claimed is:

1. In a method for making a cellular polyurethane plastic by a process which comprises reacting an organic polyisocyanate with water and an organic compound having a plurality of hydrogen atoms reactive with an —NCO group, said organic compound being capable of forming a polyurethane by reaction with an organic polyisocyanate and having a molecular weight of at least about 500, an hydroxyl number of not more than about 225 and an acid number of not more than about 2, the improvement which comprises bringing about the said reaction in the presence of a catalytic amount of a compound having the formula

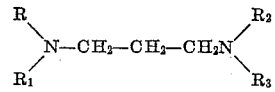

wherein R, $R_1$, $R_2$, and $R_3$ are selected from the group consisting of alkyl radicals having from one to four carbon atoms and rings formed by the connection of R and $R_1$ and $R_2$ and $R_3$.

2. The process of claim 1 wherein the catalyst is N-methyl-N-isopropyl-3-(dimethylamino) propylamine.

3. The process of claim 1 wherein the catalyst is N,N-diethyl-3-(dimethylamino) propylamine.

4. The process of claim 1 wherein the catalyst is an N,N-dialkyl-3-(dimethylamino) propylamine.

5. The process of claim 1 wherein said organic compound having reactive hydrogens is a polyalkylene ether glycol having a molecular weight of at least about 500.

6. In a method for making a cellular polyurethane plastic by a process which comprises reacting an excess of an organic polyisocyanate with an organic compound having a plurality of hydrogen atoms reactive with an —NCO group, said organic compound being capable of forming a polyurethane by reaction with an organic polyisocyanate and having a molecular weight of at least about 500, an hydroxyl number of not more than about 225 and an acid number of not more than about 2, to form a prepolymer having terminal —NCO groups and then reacting the prepolymer and water in the presence of a catalytic amount of compound having the formula

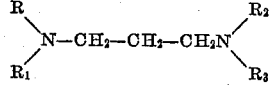

wherein R, $R_1$, $R_2$, and $R_3$ are selected from the group consisting of alkyl radicals having from one to four carbon atoms and rings formed by the connection of R and $R_1$ and $R_2$ and $R_3$.

7. The process of claim 6 wherein the catalyst is N,N-diethyl-3-(dimethylamino) propylamine.

References Cited in the file of this patent

UNITED STATES PATENTS

| | | |
|---|---|---|
| 2,716,134 | Reynolds et al. | Aug. 23, 1955 |
| 2,783,237 | Cavallito et al. | Feb. 26, 1957 |
| 2,866,774 | Price | Dec. 30, 1958 |
| 2,888,411 | Pace | May 26, 1959 |
| 2,906,717 | Sekmakas | Sept. 29, 1959 |

FOREIGN PATENTS

| | | |
|---|---|---|
| 1,135,863 | France | Dec. 22, 1956 |